(12) United States Patent
Wonder (10) Patent No.: US 11,634,338 B1
(45) Date of Patent: Apr. 25, 2023

(54) PROCESS FOR PRODUCING ALUMINUM CHLOROHYDRATE PARTICLES

(71) Applicant: USALCO, LLC, Baltimore, MD (US)

(72) Inventor: Bruce Wonder, Abingdon, MD (US)

(73) Assignee: USALCO, LLC, Baltimore, MD (US)

( * ) Notice: Subject to any disclaimer, the term of this patent is extended or adjusted under 35 U.S.C. 154(b) by 0 days.

(21) Appl. No.: 15/455,651

(22) Filed: Mar. 10, 2017

Related U.S. Application Data (60) Provisional application No. 62/307,259, filed on Mar. 11, 2016.

(51) Int. Cl.
| | | |
|---|---|---|
| C01F 7/56 | (2022.01) | |
| C01F 7/57 | (2022.01) | |
| B01J 2/02 | (2006.01) | |
| B01J 2/04 | (2006.01) | |

(52) U.S. Cl.
CPC .. *C01F 7/56* (2013.01); *B01J 2/02* (2013.01)

(58) Field of Classification Search
CPC ...................................... C01F 7/56; B01J 2/02
See application file for complete search history.

(56) References Cited

U.S. PATENT DOCUMENTS

| | | | |
|---|---|---|---|
| 2,470,315 A | 5/1949 | McGhee | 241/54 |
| 2,671,009 A | 3/1954 | Comstock | 23/90 |
| 3,462,086 A | 8/1969 | Bertrand et al. | 241/5 |
| 3,876,758 A | 4/1975 | Beekman | 424/47 |
| 3,878,293 A | 4/1975 | Piccolo et al. | |
| 3,891,745 A | 6/1975 | Bellan et al. | |
| 3,953,584 A | 4/1976 | Danner et al. | |
| 4,029,750 A | 6/1977 | Schoener et al. | |
| 4,090,916 A | 5/1978 | Papafingos et al. | 159/9 A |
| 4,203,812 A | 5/1980 | Bergner et al. | |
| 4,259,311 A | 3/1981 | Shah | |
| 4,369,173 A * | 1/1983 | Causland | A61K 8/11 424/401 |
| 4,390,131 A | 6/1983 | Pickrel | 241/1 |
| 5,167,372 A | 12/1992 | Poggie et al. | 241/23 |
| 5,573,582 A | 11/1996 | Inui et al. | 106/287.17 |

(Continued)

FOREIGN PATENT DOCUMENTS

| | | | | |
|---|---|---|---|---|
| CN | 102607248 A | 7/2012 | .............. | F26B 17/10 |
| DE | 273824 A1 | 11/1989 | ................ | C01F 7/30 |

(Continued)

OTHER PUBLICATIONS

Beavon, "Aluminum chloride with water", 1 page, taken from https://web.archive.org/web/20160124201118/http://www.rod.beavon. org.uk/AICI3_and_water.htm (Year: 2016).*

(Continued)

*Primary Examiner* — Ngoc-Yen Nguyen
(74) *Attorney, Agent, or Firm* — Sunstein LLP (57) ABSTRACT

A method of producing particles of aluminum chlorohydrate includes (a) feeding a solution of aluminum chloride through an atomizer associated with a spray dryer, so that a spray of droplets of the solution is formed in the spray dryer, (b) operating the dryer at a temperature sufficient to cause transformation of the droplets into crystal particulates and to dry the crystal particulates, such dried crystal particulates being aluminum chlorohydrate, and (c) recovering the dried crystal particulates. A product produced by the process is also described.

12 Claims, 9 Drawing Sheets

(56) References Cited

U.S. PATENT DOCUMENTS

| | | | | |
|---|---|---|---|---|
| 5,985,234 | A | 11/1999 | Dulko | 423/467 |
| 5,997,838 | A | 12/1999 | Dulko | 423/462 |
| 6,036,935 | A | 3/2000 | Dulko | 423/462 |
| 6,145,765 | A | 11/2000 | Capelle, Jr. et al. | 241/5 |
| 6,152,974 | A | 11/2000 | Delpiano et al. | 44/593 |
| 9,611,155 | B2 | 4/2017 | Dulko | 252/175 |
| 10,040,073 | B2 | 8/2018 | Wonder | |
| 2004/0040178 | A1 | 3/2004 | Coles et al. | 34/591 |
| 2007/0187256 | A1 | 8/2007 | Pratt et al. | |
| 2007/0286830 | A1* | 12/2007 | Li | A61K 8/26 424/68 |
| 2008/0181840 | A1* | 7/2008 | Steelhammer | B01J 27/128 423/495 |
| 2014/0007455 | A1 | 1/2014 | Backlund | 34/386 |
| 2015/0021514 | A1 | 1/2015 | Dulko | |
| 2016/0074873 | A1* | 3/2016 | Wonder | C01F 7/007 428/402 |

FOREIGN PATENT DOCUMENTS

| | | | | |
|---|---|---|---|---|
| EP | 0530598 | A1 | 3/1993 | C01F 7/56 |
| GB | 576557 | A | 4/1946 | |
| GB | 1266328 | A | 3/1972 | B02C 21/00 |
| WO | WO 90/08738 | A1 | 8/1990 | C01F 7/56 |
| WO | WO 01/97768 | A2 | 12/2001 | A61K 7/34 |

OTHER PUBLICATIONS

Hartman et al, "Thermal Decomposition of Aluminum Chloride Hexahydrate", Ind. Eng. Chem. Res. 2005, 44, pp. 6591-6598, (Year: 2005).*

Sathish et al , "Granulation of Nano Alumina Power for Improved Flowability by Spray Drying", Trans Indian Inst Met, Aug. 21, 2012, 6 pages (Year: 2012).*

Santos et al, "Spray drying: An overview", Biomaterials—Physics and Chemistry—New Edition, Chapter 2, pp. 9-35, 2018 (Year: 2018).*

Arvaniti et al., "Determination of particle size, surface area, and shape of supplementary cementitious materials by different techniques," Material and Structures, 15 pages, Oct. 4, 2014.

Frías et al., "Determination of Specific Surface Area by the Laser Diffraction Technique. Comparison with the Blaine Permeability Method," Cement and Concrete Research, vol. 21, No. 5, pp. 709-717, 1991.

Harrigan, "Measuring Cement Particle Size and Surface Area by Laser Diffraction," Research Results Digest 382, National Cooperative Highway Research Program, Transportation Research Board of the National Academies, 24 pages, Apr. 2013.

Horiba Instruments, Inc., A Guidebook to Particle Size Analysis, Horiba Inc. Scientific, 32 pages, 2012.

ISO, Particle size analysis—Laser diffraction methods, International Standard, ISO 13320, 57 pages, 2009.

Malvern Instruments Limited, A basic guide to particle characterization, Limited Whitepaper, Malvern, 24 pages, 2015.

Malvern Instruments Limited, Mastersizer 3000, User Manual, Malvern, Limited MAN0474-06-EN-00, 196 pages, Jun. 2015.

Malvern Instruments Limited, Mastersizer 3000, Smarter Particle Sizing, Malvern, Limited 20 pages.

Tzoupanos et al., "Coagulation-flocculation processes in water/wastewater treatment: the application of new generation of chemical reagents," $6^{th}$ IASME/WSEAS International Conference on Heat Transfer, Thermal Engineering and Environment, Rhodes, Greece, pp. 309-317, Aug. 20-22, 2008.

Yang et al., Characteristics of High-purity *Polyaluminum chloride* Species Prepared by Homogenous Alkalization, Natural Science Journal of Xiangtan University, vol. 27, No. 4, pp. 68-72, Jan. 1, 2005 (In Chinese).

Yang et al., Characteristics of High-purity *Polyaluminum chloride* Species Prepared by Homogenous Alkalization, Natural Science Journal of Xiangtan University, vol. 27, No. 4, 4 pages, 2005 (English Abstract).

Hartman, et al., Thermal Decomposition of Aluminum Chloride Hexahydrate, Ind. Eng. Chem. Res., 2005,44, 3591-6598.

Fisher Scientific, Aluminum Chloride Hexahydrate—Description, 2008, 2 pages.

Contec, Commercial Brochure, Polyaluminum Chloride, 4 pages, printed in 2016 (Year: 2016).

Park et al., Bench-scale decomposition of aluminum chloride hexahydrate to produce poly(aluminum chloride), Ind. Eng. Chem. Res. 2000, 39, 4173-4177 (Year: 2000).

Nair & Narayanan, Microfines disk centifuge pneumatic classifier for fluid energy-based communication systems, Adv. Powder Technol., vol. 10, No. 2, 145-157 (1999) (Year: 1999).

International Searching Authority, International Search Report—International Application No. PCT/US2015/049839, dated May 30, 2016, together with the Written Opinion of the International Searching Authority, 24 pages.

International Searching Authority, International Preliminary Report on Patentability—International Application No. PCT/US2015/049839 dated Jan. 30, 2017,27 pages.

Watson, Inc., Excerpt from https://www.watson-inc.com/our-capabilities/spray-drying/, "What is a Spray Dryer?", accessed Jul. 28, 2019, 2 pages.

SDS Spray Drying Systems, Inc., Excerpt from https://www.spraydrysys.com/spray-dryers/spray-dryers.html/, "Spray Dryers and Spray Drying Technology", accessed Jul. 28, 2019, 1 page.

Gharasallaoui et al., "Applications of spray-drying in microencapsulation of food ingredients: An overview", Food Research Int'l, vol. 40, pp. 1107-1121, Jul. 2007.

Perry et al., Excerpt from Chemical Engineers' Handbook, Fifth Edition, 1973, 8 pages.

* cited by examiner

PROCESS FOR PRODUCING ALUMINUM CHLOROHYDRATE PARTICLES

RELATED APPLICATION

The present application claims the benefit of provisional application Ser. No. 62/307,259, filed Mar. 11, 2016. This related application is hereby incorporated herein by reference in its entirety.

TECHNICAL FIELD

The present invention relates to processes for producing aluminum chlorohydrate particles.

BACKGROUND ART

In the manufacture of aluminum chlorohydrate there are two basic approaches, the first, and more traditional, is to add aluminum molecules to a chloride source in an aqueous environment where water also becomes part of the reaction. In this case refined aluminum is used as the source of the aluminum atoms added to form the chlorohydrate species.

The second approach to manufacturing chlorohydrate is the opposite of the traditional method where rather than adding aluminum to chloride, the reaction is carried out by removing chlorine atoms. In this case, an aluminum bearing ore (bauxite), refined bauxite, or aluminum trihydrate, or other forms of aluminum that can be solubilized in a chloride environment (including the refined aluminum used in the traditional method) are dissolved to form an aluminum chloride solution. This solution when concentrated beyond saturation will produce aluminum chloride hexahydrate crystals.

These hexahydrate crystals, when exposed to energy that elevates the temperature of the crystal, will decompose, releasing hydrochloric acid and water. In this decomposition reaction, as the chlorine atom leaves the crystal, it strips one of the hydrogens from one of the waters of hydration associated with the crystal. This leaves a free hydroxyl group to replace the leaving chlorine atom so that the charge of the molecule being formed remains balanced. The result is an increasing basicity molecule.

Problems associated with this process include that when energy enters the crystal it does so from the exterior, so that when the decomposition occurs, a porous insulating layer forms on the surface of the hexahydrate crystal, protecting the crystal and increasing the energy required for decomposition. Additionally, as each chloride leaves the crystal, a higher level of energy (temperature) is required to remove the next chloride from the molecule.

Novel processes for producing aluminum chlorohydrate particles without the problems discussed above are needed.

SUMMARY OF THE EMBODIMENTS

In a first embodiment of the present invention, there is provided a method of producing particles of aluminum chlorohydrate. In this embodiment, the method includes:
   a) feeding through an atomizer associated with a spray dryer, a solution of aluminum chloride and a source of heated air, so as to form a spray of droplets of the solution in the spray dryer;
   b) operating the dryer at a temperature sufficient to cause transformation of the droplets into crystal particulates and to dry the crystal particulates, such dried crystal particulates being aluminum chlorohydrate; and
   c) recovering the dried crystal particulates.

In a further related embodiment, operating the dryer includes heating in one or in a plurality of stages, including, for example, a first stage during which the crystal particulates are formed in a first portion of the dryer and a second stage during which the crystal particulates are dried in a second portion of the dryer. Optionally, temperature of the second portion of the dryer during the second stage is higher than the temperature of the first portion of the dryer during the first stage. As a further option, the ambient first stage temperature is about 220 degrees Fahrenheit. As yet another option, the ambient second stage temperature is about 382 degrees Fahrenheit.

Alternatively, the operating the dryer includes heating in a single stage, wherein the droplets are transformed into dried crystal particulates. As a further option, the ambient single stage temperature is at least 382 degrees Fahrenheit. Alternatively, the ambient single stage temperature is in a range of 550 to 1200 degrees Fahrenheit.

In one embodiment, a method of producing particles of aluminum chlorohydrate includes providing a spray dryer having an air source that produces an air stream. The air stream is heated to a temperature of 550-1200° F. to provide a heated air stream. The method further includes introducing a spray of droplets of a solution of aluminum chloride into the heated air stream, the aluminum chloride having a formula selected from the group consisting of $AlCl_3$, $Al_2Cl_6$, and combinations thereof. The method further includes operating the spray dryer to allow for a sufficient residence time to cause transformation of the droplets into crystal particulates of aluminum chloride hexahydrate and to decompose the crystal particulates to form dried crystal particulates of aluminum chlorohydrate, and recovering the dried crystal particulates of aluminum chlorohydrate.

In related embodiments, operating the dryer may include heating in a plurality of stages, including a first stage during which the crystal particulates of aluminum chloride hexahydrate are formed in a first portion of the dryer and a second stage during which the crystal particulates are decomposed to form the dried crystal particulates of aluminum chlorohydrate in a second portion of the dryer. Exit temperature of the second portion of the dryer for the second stage may be higher than the exit temperature of the first portion of the dryer for the first stage, wherein the second portion of the dryer for the second stage includes an additional heat source for heating the second stage. The exit temperature of the second portion of the dryer for the second stage may range from 330-390 degrees Fahrenheit. Operating the dryer may include heating in a single stage, wherein the droplets are transformed into the crystal particulates of aluminum chloride hexahydrate and decomposed into dried crystal particulates of aluminum chlorohydrate in the single stage. The exit temperature of the first portion of the dryer for the first stage may range from 220-230 degrees Fahrenheit. The exit temperature of the second portion of the dryer for the second stage may range from 380-390 degrees Fahrenheit. Volume of the spray dryer may be sufficient to allow the residence time for a decomposition reaction to take place, wherein the residence time ranges from 5 to 10 seconds. An exit temperature of the spray dryer after the crystal particulates decompose to form dried crystal particulates of aluminum chlorohydrate may be about 380-390 degrees Fahrenheit. Operating the spray dryer may include providing an additional heat source for heating the second stage to decompose the crystal particulates to form the dried crystal particulates of aluminum chlorohydrate. The additional heat source may be a second air source with an air stream heated to a temperature of about 600-1200° F.

In one embodiment, a method of producing particles of aluminum chlorohydrate includes providing a first spray dryer having an air source that produces a first air stream. The first air stream is heated to a temperature of 550-1200° F. to provide a heated air stream. The method further includes introducing a spray of droplets of a solution of aluminum chloride into the heated air stream, the aluminum chloride having a formula selected from the group consisting of $AlCl_3$, $Al_2Cl_6$, and combinations thereof. The method further includes operating the first spray dryer to allow for a sufficient residence time to cause transformation of the droplets into crystal particulates of aluminum chloride hexahydrate, and providing a second spray dryer having an air source that produces a second air stream, the second air stream heated to a temperature of 600-1200° F. The method further includes operating the second spray dryer to allow the crystal particulates to decompose to form dried crystal particulates of aluminum chlorohydrate, and recovering the dried crystal particulates of aluminum chlorohydrate.

In another embodiment, there is provided a product produced according to any one of the foregoing methods.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

Aluminum chloride solution exists and is written as $AlCl_3$. Aluminum chloride also exists as a dimer or $Al_2Cl_6$ under the right conditions, typically as it transitioning towards aluminum chlorohydrate. Aluminum chloride hexahydrate is typically written as $AlCl_3*6H_2O$. It appears that the dimer species forms as part of the crystallization process and the true formula for aluminum chloride hexahydrate is $Al_2Cl_6*12H_2O$.

Support for the dimer species can be found in a model of the aluminum chloride dimer species, where 12 negatively charged regions appear to be present around the molecule that would hold the positively charged hydrogen in a water of hydration. This assembly of the dimer and waters of hydration would stack in a very ordered structure, also known as a crystal. This view of the dimer species also supports the following sequence of decomposition of the hexahydrate crystal:

| | | |
|---|---|---|
| Hexahydrate Crystal | (0% basic) | $Al_2Cl_6 * 12H_2O$ |
| First step decomposition | (16% basic) | $Al_2(OH)Cl_5 * 9H_2O$ + HCl + $3H_2O$ |
| Second step decomposition | (33% basic) | $Al_2(OH)_2Cl_4 * 7H_2O$ + HCl + $2H_2O$ |
| Third step decomposition | (50% basic) | $Al_2(OH)_3Cl_3 * 5H_2O$ + HCl + $2H_2O$ |
| Fourth step decomposition | (66% basic) | $Al_2(OH)_4Cl_2 * 3H_2O$ + HCl + $2H_2O$ |
| Fifth step decomposition (chlorohydrate) | (83% basic) | $Al_2(OH)_5Cl_1 * 0.5H_2O$ + HCl + $2.5H_2O$ |
| Sixth step decomposition | (100% basic) | $Al_2(OH)_6$ + HCl + $0.5H_2O$ (alumina) |

The high purity alumina is the root of what people have sought to produce. Each decomposition step occurs at a higher temperature than in the prior art.

In the process recited in my U.S. patent application Ser. No. 14/852,458, filed Sep. 11, 2015, and having publication number US2016/0074873 A1, which is hereby incorporated herein by reference in its entirety as my publication US2016/0074873 A1, crystals of hexahydrate are ground by impact and collisions, as well as fractured by the buildup of internal pressure to the crystals. This causes the particles to either release decomposed material that is separated by centrifugal forces from the process, or expose under decomposed material to the thermal energy, allowing them to decompose as well.

An alternative approach, discussed herein, creates a particle that does not require fracture to allow decomposition to reach the center of the particle. In one embodiment, a method to accomplish creation of such a particle utilizes a spray dryer under conditions described herein to produce a particle that will decompose without requiring fracture.

Such an approach creates an initial particle that has a very high surface to volume ratio, allowing the decomposition gases to escape without having to build pressure. In this context, atomization may be used, for example, to create a particle having a diameter that would be equal to the twice the thickness of the insulating layer that forms on the crystal protecting the internal from the thermal energy to decompose.

In the spray drying process, a solution of aluminum chloride is introduced to the dryer through a fine spray or an atomizing nozzle. This spray is introduced into the incoming air stream heated to a temperature (for example, in the 550-1200° F. range) sufficient to provide the energy needed to evaporate the excess water above what is needed to form hexahydrate crystals and potentially the energy required to perform the decomposition to the desired step. The sprayed particles need to be small enough that they would have changed from a liquid to a solid before they reach the walls of the dryer or they will stick to the system.

This is the current technology used to produce spray dried chlorohydrate from a chlorohydrate solution. In this case careful application of the thermal energy to the chlorohydrate solution needs to be addressed so that the unwanted or additional decomposition does not occur. Otherwise, there results a hazy solution when the dry material is placed in solution.

When the solution entering the dryer is aluminum chloride rather than chlorohydrate, the energy consumed to evaporate the excess water and the energy that goes into forming the hexahydrate crystal cools the mixture (Air/Water/Solids) and allows the mixture to pass through the extreme heat section without damaging the chlorohydrate molecule.

In a typical spray dryer, the process of drying happens very quickly, and there may not be time for the dried product to decompose into the desired end product. Everything in this system is traveling in parallel with little-to-no back mixing. It may be necessary to add an extended conveying section between the spray drier to the separation systems to allow for sufficient residence time at temperature for the reaction to be completed before the solids are separated from the energy.

If the burner of the spray drier has insufficient energy to perform the complete process or if temperatures needed to be lowered in order to allow the proper species of crystal to form in the dryer, additional energy may be added after the spray dryer processing in the form of heated gases or by jacketing the conveyance piping of product with circulating high temperature fluid.

In either case, the rate of addition of aluminum chloride solution to the system is adjusted so that the inlet temperature to the separation system can be controlled to a specified temperature, as in my publication US2016/0074873 A1. It is this temperature that will set the level of decomposition achieved. In particular, the data associated with FIG. 9 are exemplary. As discussed above, FIG. 9 is a scatter plot graph showing the relationship between the level of decomposition achieved and the temperature to which material is exposed on contacting the heat source. The data in this figure have been gathered from using the system described in my publication US2016/0074873 A1. Because, the data in this figure necessarily reflect particular conditions, including pressure and flow rate, other flow rates and pressures may change the shape and positions of the curve implied by the data.

Some additional considerations include taking care to insure that a crystalline solid is formed. If the temperature differential is too great and an amorphous solid is formed, there is the potential that the resultant aluminum chloride may not form the hexahydrate species.

In the second stage of the processes described, the particles are decomposed. At this point, there would be no free moisture on the surface of the particle. Any moisture would be in the form of waters of hydration. We have found that the temperature of the gases used to heat the particles has an effect on the basicity. Experiments have shown that if the temperature is too high, the basicity results become unpredictable, in a manner analogous to boiling phenomena experienced in a distillation column. The removal of each successive chloride from the molecule is associated with an energy change and a temperature change in the environment.

For the second stage temperature, ideally just enough energy is put into the system at the optimum temperature corresponding to the exit temperature of perfect aluminum chlorohydrate (ACH) ($Al_2(OH)_5Cl$). Although we have recited 382 degrees Fahrenheit, good ACH has also been produced with exit temperature in the 330 degrees Fahrenheit range, depending upon the temperature of the supply gas.

The temperature of the gases used to heat the particles has an effect on the stability of the system and of the basicity. If the gas temperature is too high, the basicity results become unpredictable, as discussed previously. As long as the particle that is being decomposed has a sufficient mass of lower energy-state basicity, it will keep itself at a constant temperature by expelling decomposition gases. Once the lower energy state material is depleted in an individual particle, if the surrounding gases are at a higher temperature than the depleted particle, the particle temperature will begin to rise until it either reaches the next energy state or it reaches an equilibrium temperature with the heating gases.

Example 1

A stream of aluminum chloride solution is atomized into a spray dryer in a controlled fashion so that when the material reaches a temperature of 220-230° F., it will have dried and crystallized to form aluminum chloride hexahydrate particles.

At this point in the spray dryer, an additional heat source is applied to raise the temperature of the dried aluminum chloride hexahydrate particles on exit from the spray dryer to a temperature 380-390° F., and the exiting product from the spray dryer should be an aluminum chlorohydrate product.

The volume inside of the spray dryer needs to be sufficient to allow residence time in the heated environment for the decomposition reaction to take place. In various embodiments, such a residence time is in the range of 5 to 10 seconds.

The product is in a mixture of hydrogen chloride gas, water vapor, combustion by-products, and air. A combination of cyclone separators and/or dust collectors is then used to separate the dry product from the combined gas stream without allowing condensation of the gas stream. The captured dry product is expected to be of such basicity that it would be considered a form of aluminum chlorohydrate.

Example 2

A stream of aluminum chloride solution is atomized into a spray dryer in a controlled fashion so that when the material reaches an exit temperature of 380-390° F. it can dry and crystallize to form aluminum chloride hexahydrate particles that would then decompose to form an aluminum chlorohydrate product.

The volume inside the spray dryer needs to be sufficient to allow residence time in the heated environment for the decomposition reaction to take place. Typically this should be 5 to 10 seconds.

This product is in a mixture of hydrogen chloride gas, water vapor, combustion by-products and air. A combination of cyclone separators and/or dust collectors is used to separate the dry product from the combined gas stream without allowing condensation of the gas stream. The captured dry product is expected to be of such basicity that it would be considered a form of aluminum chlorohydrate.

A stream of aluminum chloride solution is atomized into a spray dryer in a controlled fashion so that when the material reaches a temperature of 220-230° F. it will dry and crystallize to form aluminum chloride hexahydrate particles.

Figure 1:
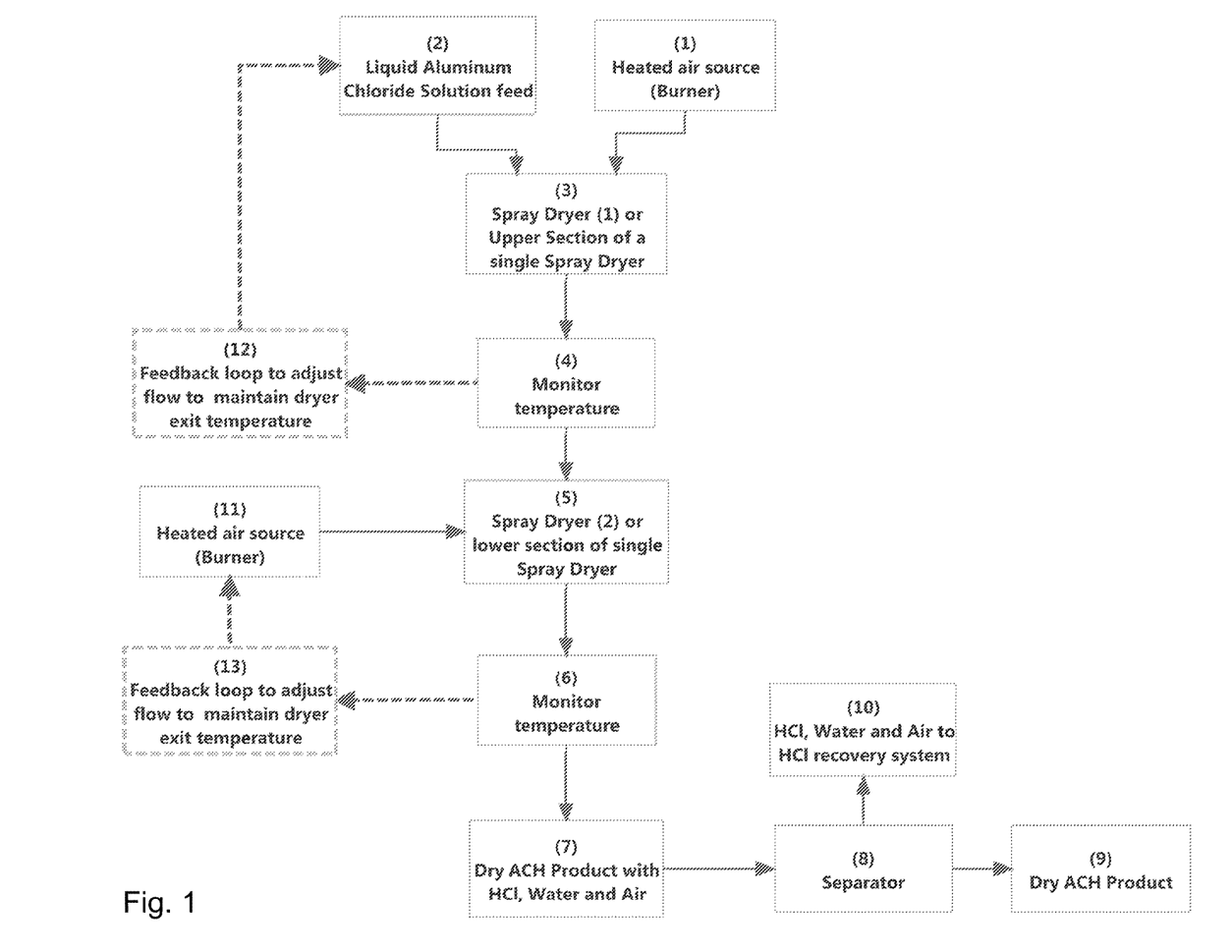
FIG. 1 is a process flow diagram showing an exemplary process for producing aluminum chlorohydrate particles from liquid aluminum chloride solution using spray drying of the liquid solution with a heated air source into a first spray dryer or a first compartment of a spray dryer (3); drying the produced droplets in the presence of HCl, water, and air (7), drying and recovering dried aluminum chlorohydrate particles (9).
Figure 2:
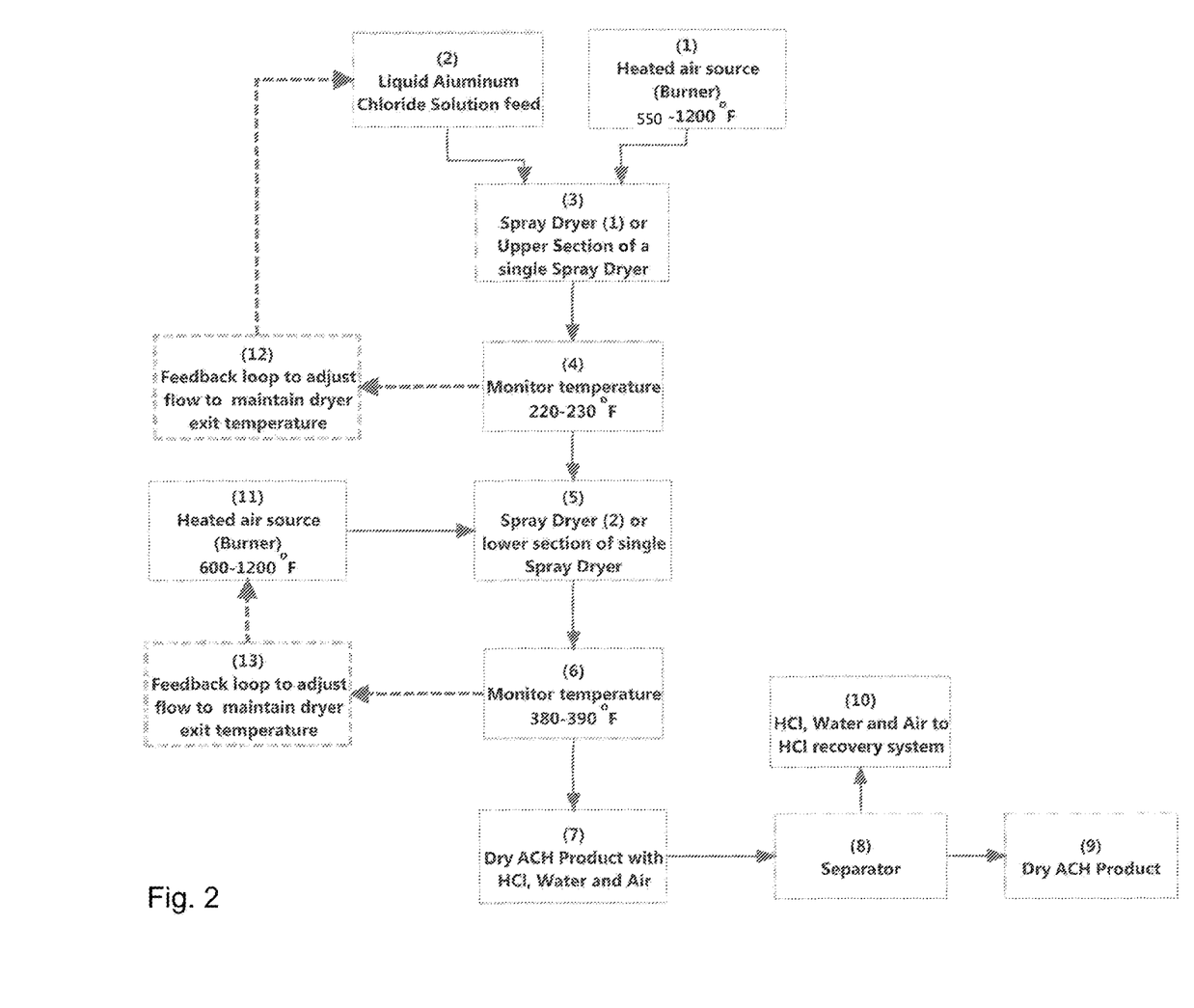
FIG. 2 shows the process flow diagram of FIG. 1 with associated temperature ranges applied.
Figure 3:
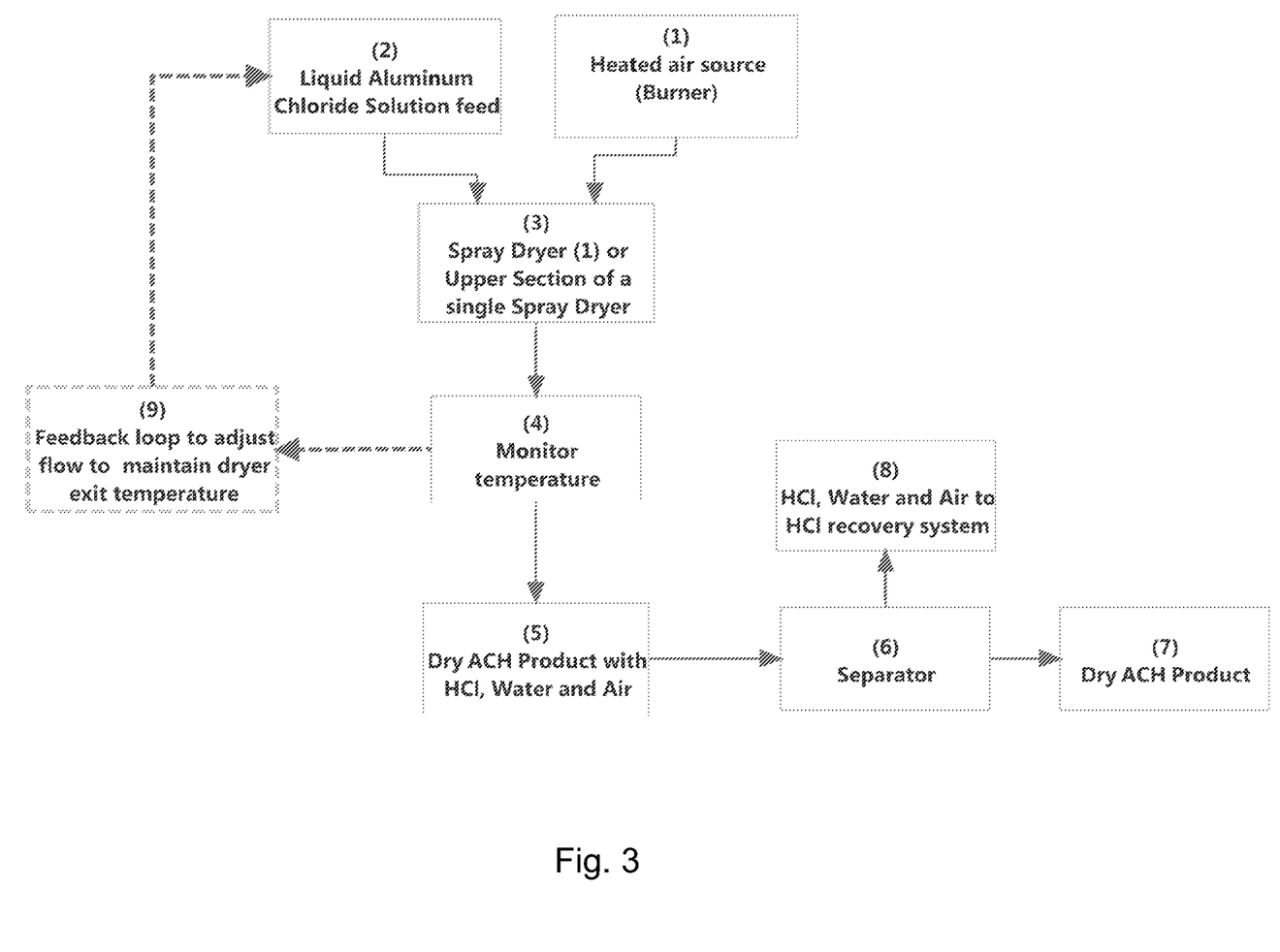
FIG. 3 is process flow diagram showing an exemplary process for producing aluminum chlorohydrate particles from liquid aluminum chloride solution using spray drying of the liquid with a heated air source into a spray dryer (1) or an first compartment of a spray dryer (3), with continued flow of the drying particles through a pneumatic conveying line (5-7) with a feedback loop maintaining exit temperature from the dryer.
Figure 4:
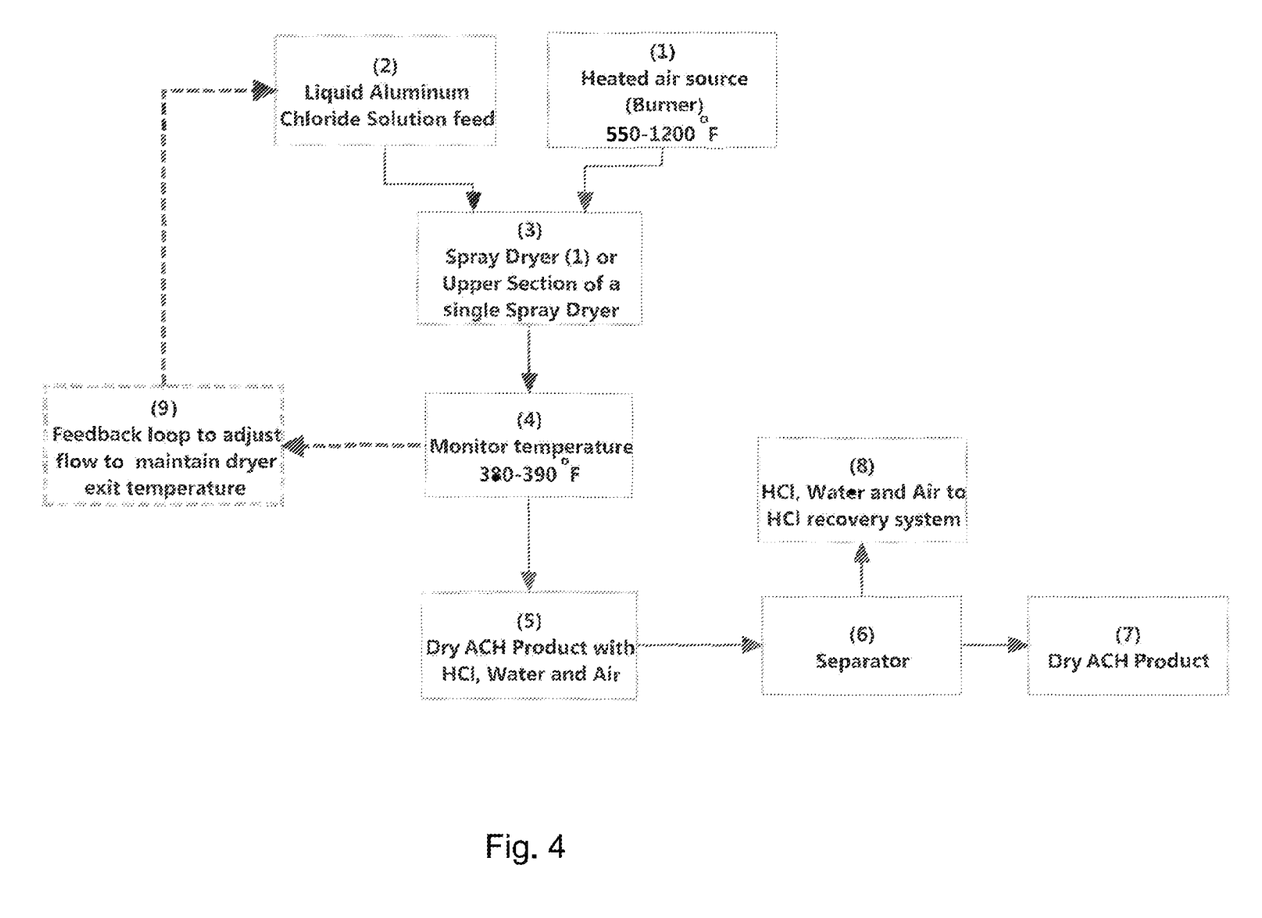
FIG. 4 shows the process flow diagram of FIG. 3 with associated temperature ranges applied.
Figure 5:
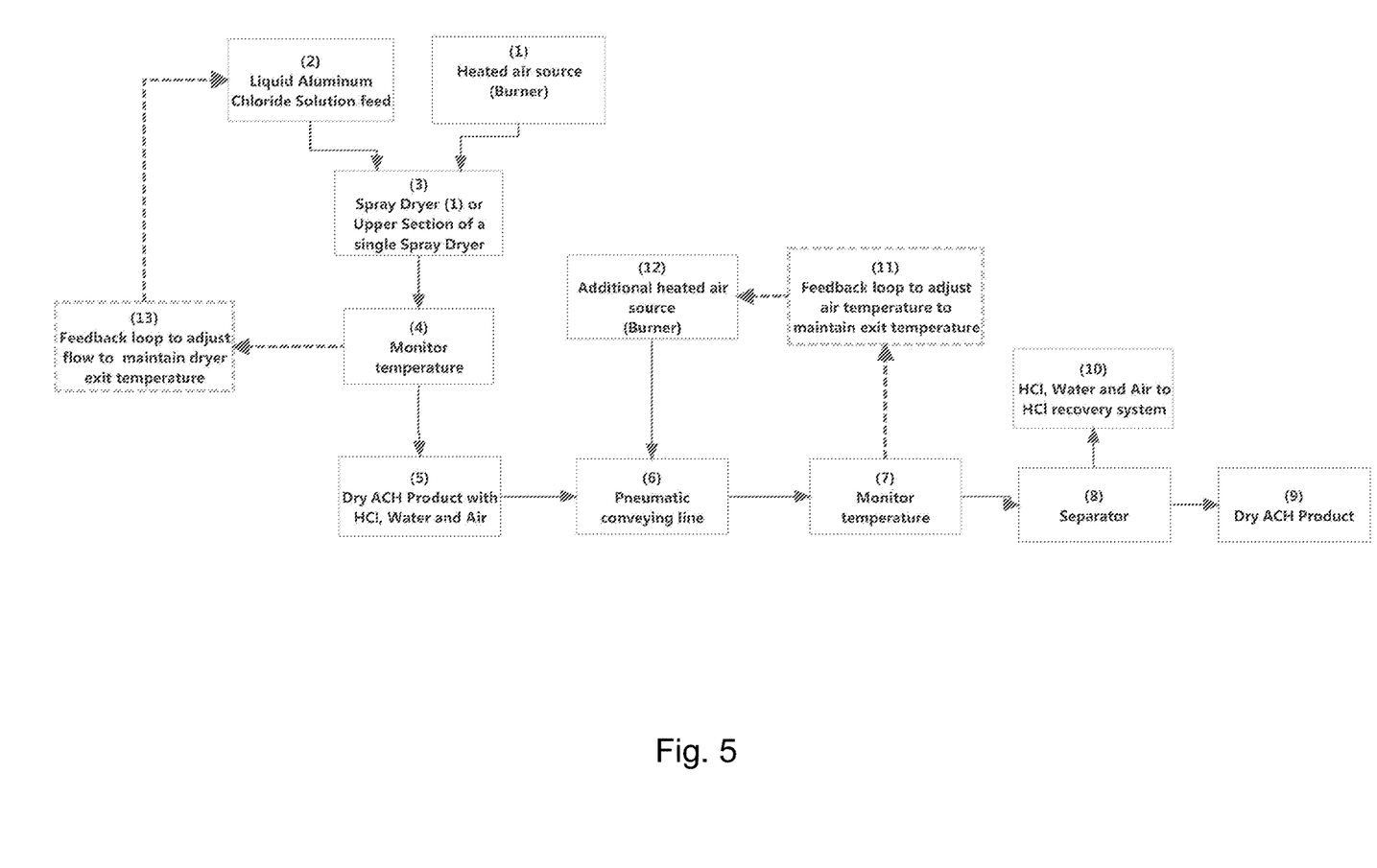
FIG. 5 is a process flow diagram showing an exemplary process for producing aluminum chlorohydrate particles from liquid aluminum chloride solution using spray drying of the liquid with a heated air source, in which spray drying is into a first spray dryer or first compartment of a spray dryer, the feed continuing into a pneumatic conveying line (6) with a second heated air source.
Figure 6:
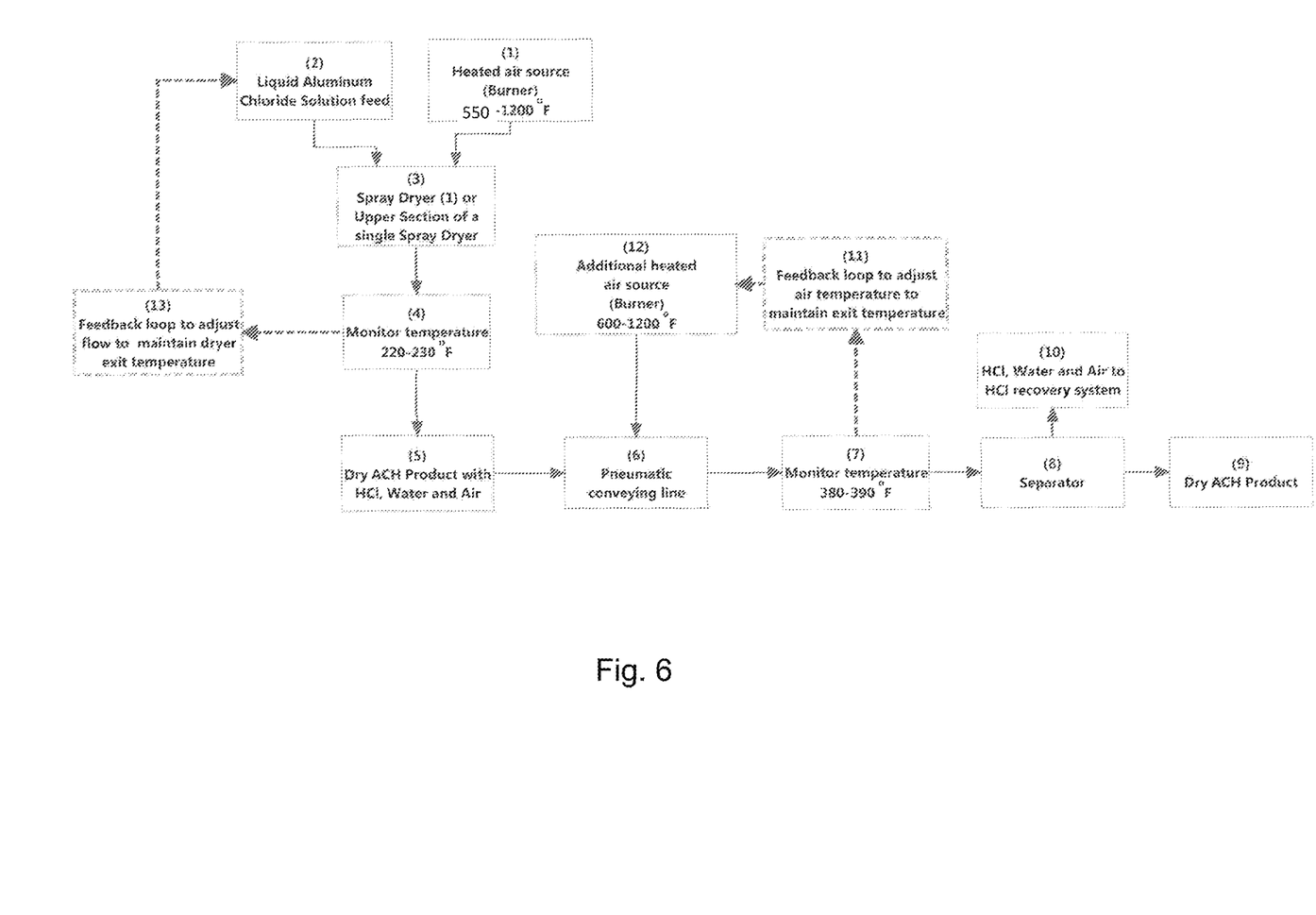
FIG. 6 shows the process flow diagram of FIG. 5 with associated temperature ranges applied.
Figure 7:
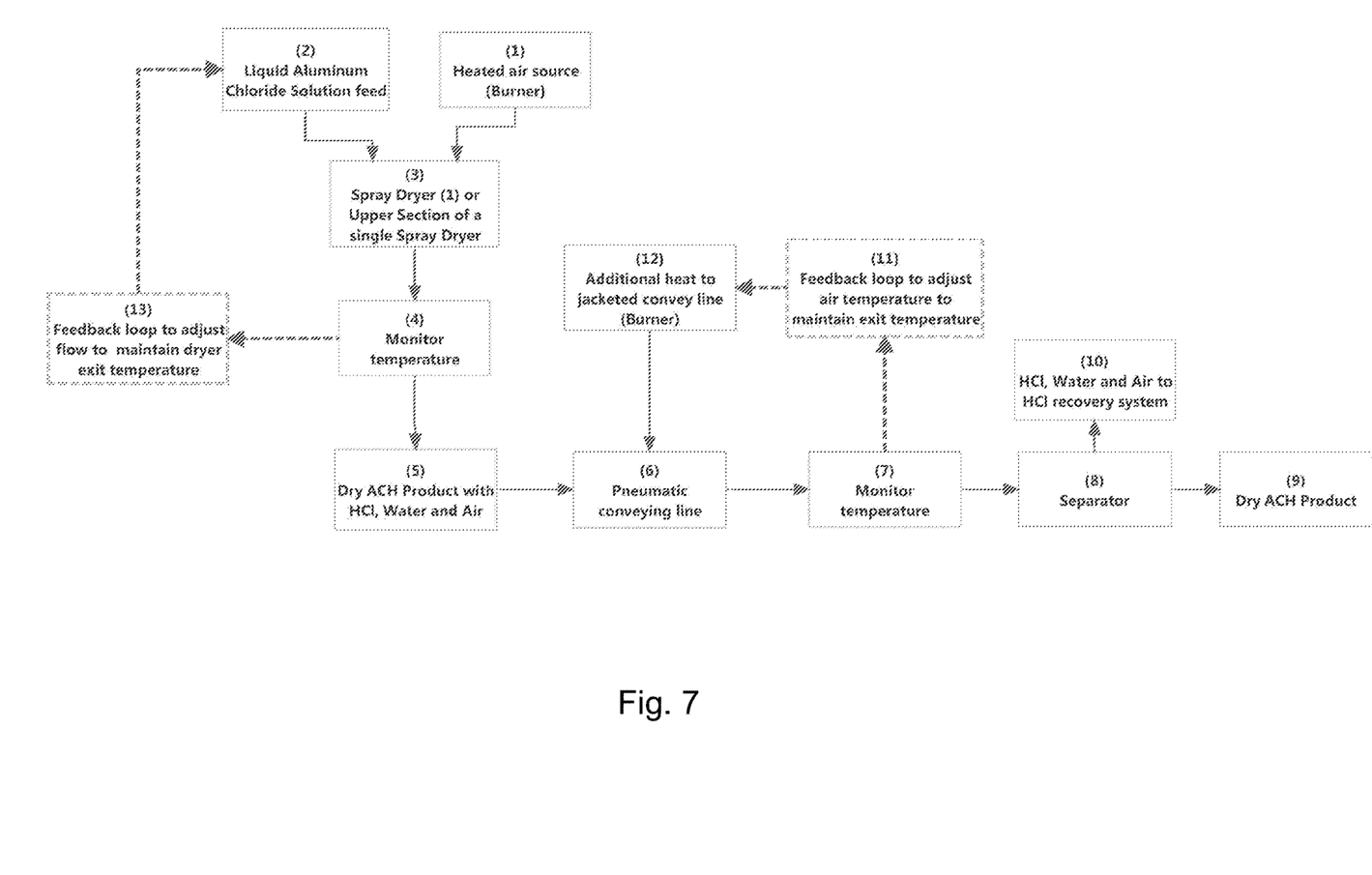
FIG. 7 is a process flow diagram showing an exemplary process for producing aluminum chlorohydrate particles from liquid aluminum chloride solution using spray drying of the liquid with a heated air source, in which spray drying is into a first spray dryer or first compartment of a spray dryer, the feed continuing into a pneumatic conveying line (6) with application of additional heat supplied by a burner (12) to a jacketed pneumatic conveying line (6).
Figure 8:
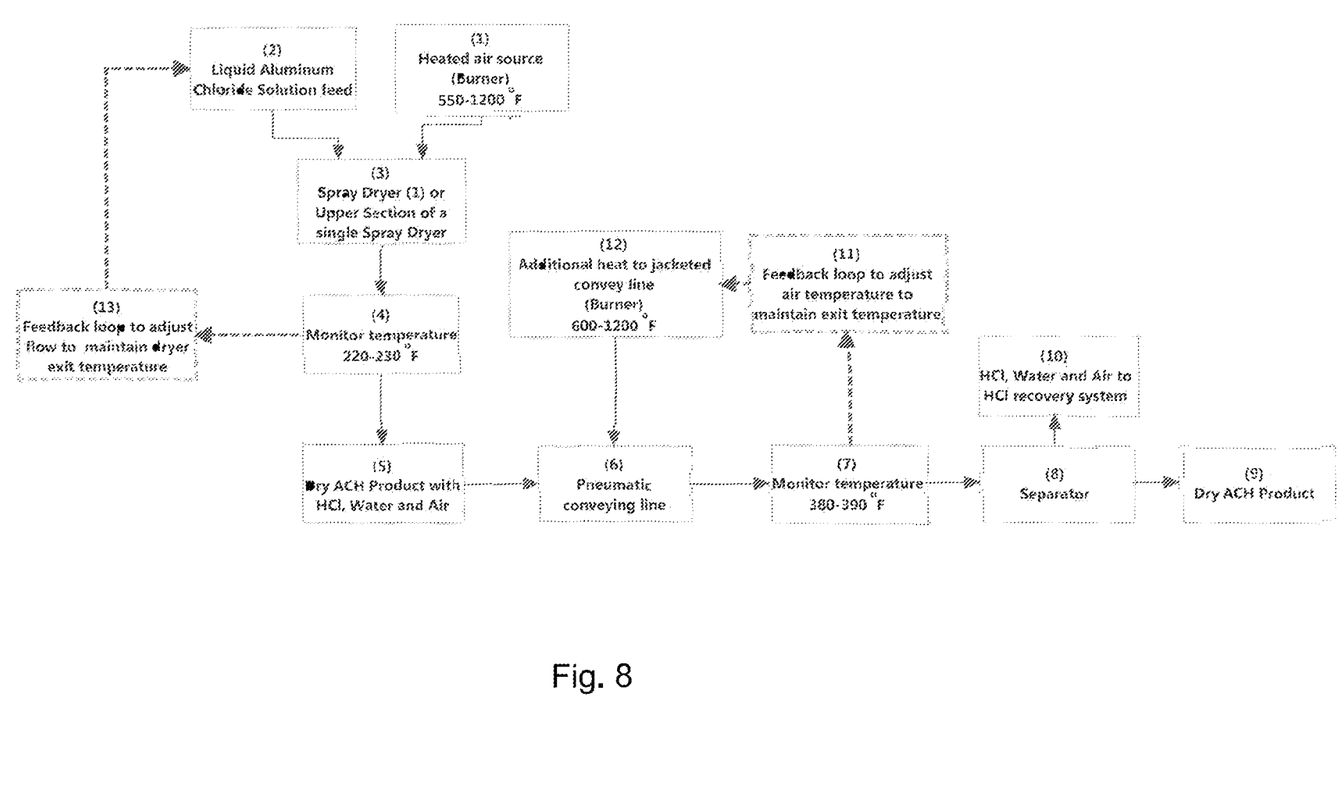
FIG. 8 shows the process flow diagram of FIG. 7 with associated temperature ranges applied.
Figure 9:
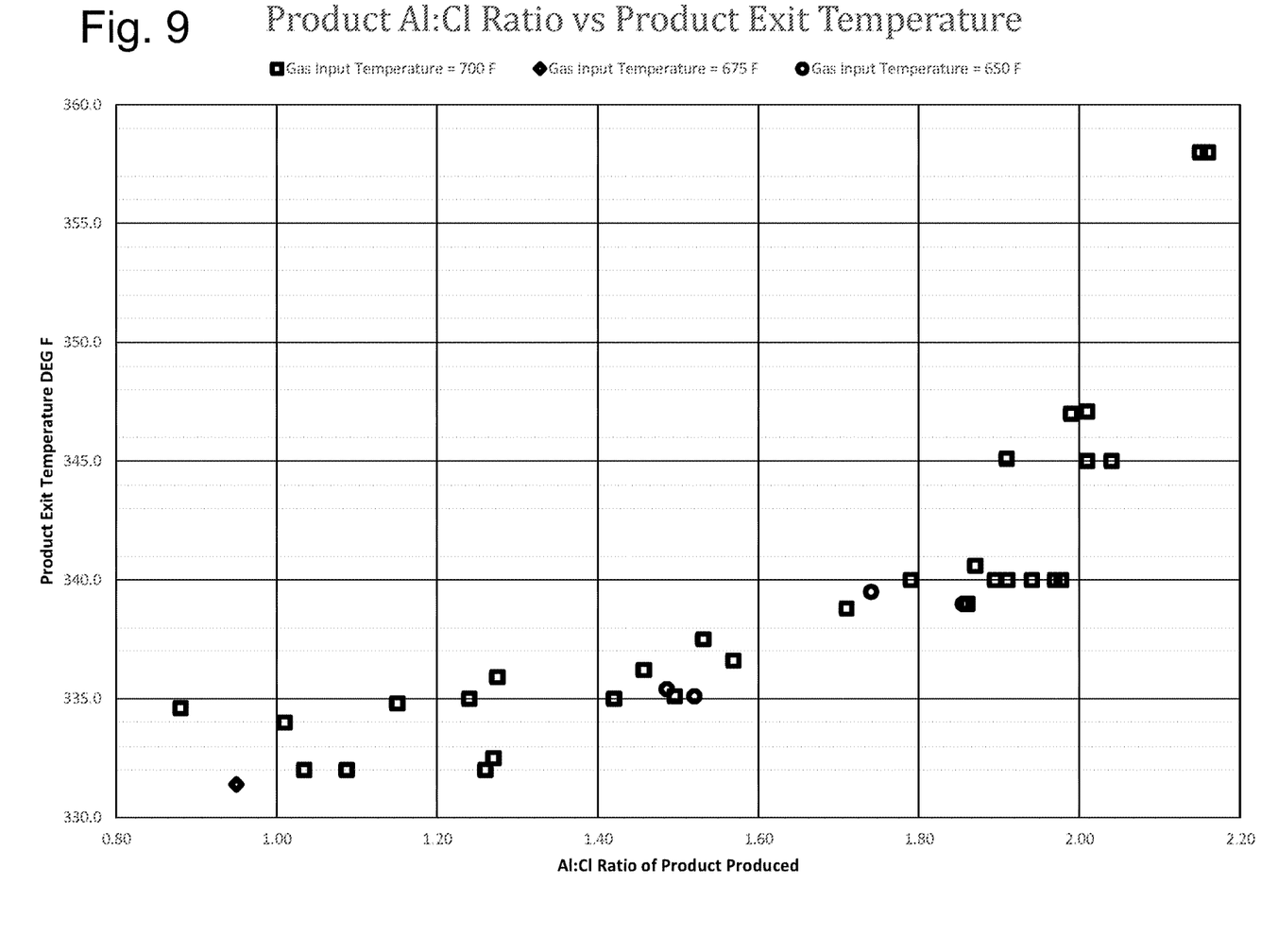
FIG. 9 is a scatter plot graph showing the relationship between the level of decomposition achieved and the temperature to which material is exposed on contacting the heat source. The data in this figure have been gathered from using the system described in my publication US2016/0074873 A1, which is discussed below. However, the data in this figure necessarily reflect particular conditions, including pressure and flow rate, so other flow rates and pressures may change the shape and positions of the curve implied by the data.

After leaving the spray dryer, additional heat is applied to complete the reaction. This could be accomplished by the addition of heated gases to the conveying lines between the spray dryer and separation equipment. (See FIGS. 5 to 8.) This could also be accomplished by externally heating those same conveying lines so that a thermal gradient existed to raise the temperature of the dried aluminum chloride hexahydrate particles to a temperature of about 380-390° F. when they exit to the separation system. (See FIGS. 7 and 8)

The products exiting the conveying line are expected to be an aluminum chlorohydrate product.

The volume inside of the spray dryer and conveying line would need to be sufficient to allow residence time in the heated environment for the decomposition reaction to take place. Typically this should be 5 to 10 seconds.

The product exiting the spray dryer/convey line reactor system would be a suspension of dry chlorohydrate in hydrogen chloride gas, water vapor, combustion by-products and air. After separating the dry product from the combined gas stream without allowing condensation of the gas stream, the captured dry product would be of such basicity that it would be considered a form of aluminum chlorohydrate.

The embodiments of the invention described above are intended to be merely exemplary; numerous variations and modifications will be apparent to those skilled in the art. All such variations and modifications are intended to be within the scope of embodiments of the present invention as defined in the appended claims.

What is claimed is:

1. A method of producing particles of aluminum chlorohydrate, the method comprising:
   providing a spray dryer having an air source that produces an air stream, the air stream heated to a temperature of 550-1200° F. to provide a heated air stream;
   introducing a spray of droplets of a solution of aluminum chloride into the heated air stream, the aluminum chloride having a formula selected from the group consisting of $AlCl_3$, $Al_2Cl_6$, and combinations thereof;
   operating the spray dryer to allow for a sufficient residence time to cause transformation of the droplets into crystal particulates of aluminum chloride hexahydrate and to decompose the crystal particulates to form dried crystal particulates of aluminum chlorohydrate; and
   recovering the dried crystal particulates of aluminum chlorohydrate.

2. A method according to claim 1, wherein operating the dryer includes heating in a plurality of stages, including a first stage during which the crystal particulates of aluminum chloride hexahydrate are formed in a first portion of the dryer and a second stage during which the crystal particulates are decomposed to form the dried crystal particulates of aluminum chlorohydrate in a second portion of the dryer.

3. A method according to claim 2, wherein exit temperature of the second portion of the dryer for the second stage is higher than the exit temperature of the first portion of the dryer for the first stage, wherein the second portion of the dryer for the second stage includes an additional heat source for heating the second stage.

4. A method according to claim 3, wherein the exit temperature of the second portion of the dryer for the second stage ranges from 330-390 degrees Fahrenheit.

5. A method according to claim 1, wherein operating the dryer includes heating in a single stage, wherein the droplets are transformed into the crystal particulates of aluminum chloride hexahydrate and decomposed into dried crystal particulates of aluminum chlorohydrate in the single stage.

6. A method according to claim 3, wherein the exit temperature of the first portion of the dryer for the first stage ranges from 220-230 degrees Fahrenheit.

7. A method according to claim 3, wherein the exit temperature of the second portion of the dryer for the second stage ranges from 380-390 degrees Fahrenheit.

8. A method according to claim 1, wherein volume of the spray dryer is sufficient to allow the residence time for a decomposition reaction to take place, wherein the residence time ranges from 5 to 10 seconds.

9. A method according to claim 1, wherein an exit temperature of the spray dryer after the crystal particulates decompose to form dried crystal particulates of aluminum chlorohydrate is 380-390 degrees Fahrenheit.

10. A method according to claim 2, wherein operating the spray dryer includes providing an additional heat source for heating the second stage to decompose the crystal particulates to form the dried crystal particulates of aluminum chlorohydrate.

11. A method according to claim 10, wherein the additional heat source is a second air source with an air stream heated to a temperature of about 600-1200° F.

12. A method of producing particles of aluminum chlorohydrate, the method comprising:
   providing a first spray dryer having an air source that produces a first air stream, the first air stream heated to a temperature of 550-1200° F. to provide a heated air stream;
   introducing a spray of droplets of a solution of aluminum chloride into the heated air stream, the aluminum chloride having a formula selected from the group consisting of $AlCl_3$, $Al_2Cl_6$, and combinations thereof;
   operating the first spray dryer to allow for a sufficient residence time to cause transformation of the droplets into crystal particulates of aluminum chloride hexahydrate;
   providing a second spray dryer having an air source that produces a second air stream, the second air stream heated to a temperature of 600-1200° F.;
   operating the second spray dryer to allow the crystal particulates to decompose to form dried crystal particulates of aluminum chlorohydrate; and
   recovering the dried crystal particulates of aluminum chlorohydrate.

* * * * *